United States Patent
He et al.

(10) Patent No.: US 8,388,241 B2
(45) Date of Patent: Mar. 5, 2013

(54) DUSTPROOF OPTICAL CONNECTOR

(75) Inventors: Jia-Yong He, Kunshan (CN); Qi-Sheng Zheng, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 356 days.

(21) Appl. No.: 12/752,432

(22) Filed: Apr. 1, 2010

(65) Prior Publication Data
US 2010/0254667 A1  Oct. 7, 2010

(30) Foreign Application Priority Data
Apr. 2, 2009  (CN) .......................... 2009 1 0301304

(51) Int. Cl.
*G02B 6/36* (2006.01)
(52) U.S. Cl. .............................. 385/92; 385/94; 385/139
(58) Field of Classification Search ............ 385/92, 385/94, 134, 135, 139
See application file for complete search history.

(56) References Cited

U.S. PATENT DOCUMENTS

| | | | | |
|---|---|---|---|---|
| 5,086,422 A * | 2/1992 | Hagiya et al. | ................. | 720/648 |
| 5,708,745 A * | 1/1998 | Yamaji et al. | .................... | 385/92 |
| 5,879,173 A * | 3/1999 | Poplawski et al. | ............ | 439/138 |
| 6,302,592 B1 * | 10/2001 | Zullig | .............................. | 385/60 |
| 6,688,780 B2 * | 2/2004 | Duran | ............................. | 385/76 |
| 7,144,163 B2 * | 12/2006 | Tanaka et al. | .................... | 385/75 |
| 7,534,115 B2 * | 5/2009 | Murano et al. | ................. | 439/138 |
| 7,542,732 B2 * | 6/2009 | Ka | ................. | 455/90.3 |
| 7,611,291 B2 * | 11/2009 | Kahle et al. | ..................... | 385/70 |

FOREIGN PATENT DOCUMENTS

WO  2008/121731  10/2008

* cited by examiner

*Primary Examiner* — Ellen Kim
(74) *Attorney, Agent, or Firm* — Wei Te Chung; Ming Chieh Chang (57) ABSTRACT

An optical connector defining a receiving space for receiving a corresponding plug includes an insulative housing, an optical module mounted to the insulative housing, a rotary door retained at a rear side of the receiving space and a slider engaging with the door. The optical module has a light receiving element forwardly exposed to the receiving space and shielded by the door. The slide can drive the door moving along an inserting direction, and rotating along an anticlockwise direction at the same time to make the light receiving element of the optical module be exposed to the receiving space when the plug is inserted into the receiving space and pushes the slider backwardly.

20 Claims, 11 Drawing Sheets

DUSTPROOF OPTICAL CONNECTOR

BACKGROUND OF THE INVENTION

1. Field of the Invention

The present invention relates to optical connectors, more particularly to dustproof optical connectors with a door covering light receiving elements thereof.

2. Description of Related Art

WO. Patent Publication No. 2008/121731 A1 discloses an optical connector designed with a plurality of optical fibers to increase signal transmission speed of a standard USB connector. The optical connector defines a mating port to receive a corresponding plug, and includes an insulative housing, a plurality of contacts retained in the housing to transmit electrical signals, and a plurality of optical fibers to transmit optical signals for increasing signal transmission speed. The housing has a tongue extending forwardly into the mating port. The tongue defines a plurality of slots at a lower side thereof. The contacts include contact portions catileveredly received in the slots. The optical fibers have light receiving elements located below the tongue and forwardly exposed into the mating port to mate with the plug. However, when the optical connector does not mate with the plug, the light receiving elements of the optical fibers are exposed to the exterior, which easily cause the light receiving elements being covered by dust, and then the optical connector can not transmit optical signals stably. Besides, the light receiving elements are located at an inner side of the mating port, which is inconvenient to clean the light receiving elements.

Hence, an improved optical connector is desired to overcome the above problems.

BRIEF SUMMARY OF THE INVENTION

According to one aspect of the present invention, an optical connector defining a receiving space for receiving a corresponding plug, comprises: an insulative housing; an optical module mounted to the insulative housing, the optical module having a light receiving element forwardly exposed to the receiving space; a rotary door retained at a rear side of the receiving space to shield the light receiving element; and a slider engaging with the door; wherein the slide can drive the door moving along an inserting direction, and rotating along an anticlockwise direction at the same time to make the light receiving element of the optical module be exposed to the receiving space when the plug is inserted into the receiving space and pushes the slider backwardly.

According to another aspect of the present invention, an optical connector comprises an insulative housing having a tongue; a metal shell covering the insulative housing and forming a receiving space with the tongue; an optical module retained on the insulative housing and having a light receiving element located at one side of the tongue and forwardly exposed to the receiving space; and a protecting mechanism located at a front side of the light receiving element to protect the light receiving element from being covered by dust.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 is an exploded view of the optical connector shown in

FIG. 7;

DETAILED DESCRIPTION OF THE PREFERRED EMBODIMENTS

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-4, an optical connector 100 for soldering to a circuit board (not shown) according to a first embodiment of the present invention is disclosed. The optical connector 100 comprises an insulative housing 1, a plurality of contacts 2 and an optical module 3 retained in the insulative housing 1, a protecting mechanism 4 mounted on the insulative housing 1 to protect the optical module 3, a metal shell 5 and a rear shell 6 covering the insulative housing 1. The optical connector 100 defines a receiving space 7 for receiving a corresponding plug (not shown).

The insulative housing 1 has a base portion 10, a tongue 11 and an assistant board 12 extending forwardly from upper and lower side of a front surface 101 of the base portion 10. The front surface 101 forwardly faces to the receiving space 7, and the tongue 11 extends to the receiving space 7. The base portion 10 defines a receiving cavity extending therethrough along an insertion direction of the plug to receive the optical module 3, and a mounting slot 13 recessed from the front surface 101 and located at one side of the receiving cavity along a transverse direction. The receiving cavity is located below the tongue 11 and neighbored with the receiving space 7 along the insertion direction. The tongue 11 extends into the receiving space 7 and defines a plurality of slots recessed from a lower surface thereof to receive the contacts 2.

The contacts 2 comprise a pair of differential signal contacts, a grounding contact and a power contact at two sides of the differential signal contacts which are similar to contacts of a standard USB 2.0 receptacle (not shown) and can transmit USB signals. Each contact 2 has a retaining portion 21 positioned in the base portion 10, a contact portion 22 extending forwardly from a front end of the retaining portion 21, and a tail portion 23 extending outwardly and downwardly from a rear end of the retaining portion 21. The contact portions 22 are cantileverdly received in the slots of the tongue 11 and can moving along a vertical direction perpendicular to an insertion direction of the plug. An arrangement of the contacts portions 22 on the tongue 11 is same to that of the standard USB 2.0 receptacle, thereby the optical connector 100 can mate with a standard USB 2.0 plug (not shown).

The optical module 3 is retained in the receiving cavity to increase signal transmission speed of the standard USB 2.0 receptacle. The optical module 3 has a body portion 31 retained at a rear side of the insulative housing 1 and a mating portion 32 extending forwardly into the receiving cavity from a front side of the body portion 31. The mating portion 32 has a pair of positioning posts 35 extending forwardly into the receiving space 7 from two sides of a front end thereof, and a pair of light receiving elements 34 between the positioning posts 35 and forwardly exposed to the receiving space 7. The positioning posts 35 are used to mate with a pair of holes of the corresponding plug for assuring a stable connection between the optical connector 100 and the plug. The light receiving elements 34 does not extend beyond the front surface 101. The mating portion 32 is located below and behind the tongue 11 to make the contact portions 22 and mating portion 32 transmit signals in two parallel levels along the vertical direction. Of course, the mating portion 32 of the optical module 3 can be positioned at upper, left or right side of the tongue 11.

The protecting mechanism 4 is retained on the insulative housing 1, and is offset to the contact portions 22 along both the insertion direction and a vertical direction and located between the tail portions 23 along a transverse direction. The protecting mechanism 4 comprises a slider 41 retained in the insulative housing 1, a rotary door 42 engaging with the slider 41, a first elastic component 43 and a second elastic component 44 retained at front and rear sides of the slider 41, and a bolt 45 partly received in the second elastic component 44. The slider 41 has a first extension portion 411 extending downwardly from a front end thereof and a second extension portion 414 extending upwardly from a rear end thereof. The first extension 411 has a projection 412 extending forwardly from a front lower side thereof and a first post 413 extending backwardly from a rear side thereof. The projection 412 extends horizontally and has a plurality of racks 4121 at an upper side thereof. The second extension portion 414 has a second post 415 extending forwardly from a front side thereof. The first post 413 and second post 415 extend along opposite two direction and parallel to each other. The second post 415 is located at an upper side of the first post 413.

The first and second elastic component 43, 44 are coil spring and extend along the insertion direction to be horizontally retained on the slider 41. The first elastic component 43 has a front end ringing on the first post 413 and a rear end abutting against an inner side wall of the mounting slot 13, thereby the first elastic component 43 is positioned on the slider 41 and sandwiched between the slider 41 and the insulative housing 1. The second elastic component 44 has a front end with the bolt 45 inserted therein and a rear end ringing on the second post 415 to position the second elastic component 44 to the slider 41.

The rotary door 42 has a shield portion 421 extending along the vertical direction to shield a front end of the mating portion 32, and a first pivot 422 and a second pivot 423 extending outwardly from two lower sides of the shield portion 421. The first pivot 422 is longer than the second pivot 423 along the transverse direction of the insulative housing 1. The first pivot 422 has a gear 4221 to mesh with the racks 4121. The gear 4221 in the present invention just comprises several teeth which do not surround the first pivot 422.

The metal shell 5 has a pair of opposed top wall 51 and bottom wall 52, and a pair of opposed side walls 53, 54 which surround the tongue 11 and formed the receiving space 7 therebetween. The bottom wall 52 defines a cutout 521 at a rear middle side thereof. The top wall 51, bottom wall 52 and side walls 53, 54 each has at least a spring arm 55 extending forwardly into the receiving space 7 to resist or lock with the corresponding plug. The rear shell 6 is located at a rear side of the insulative housing 1 and engages with the metal shell 5.

Figure 1:
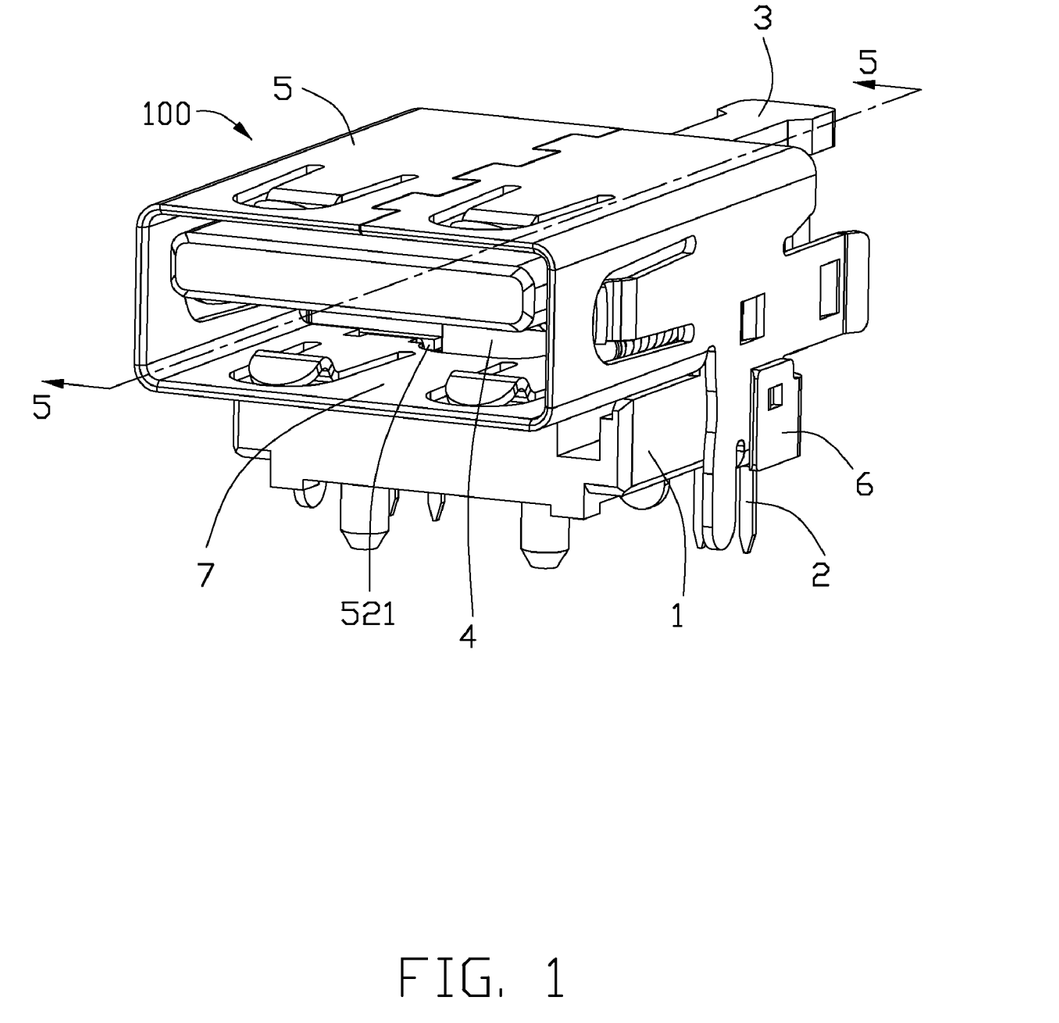
FIG. 1 is a perspective view of an optical connector according to a first embodiment of the present invention.
Figure 2:
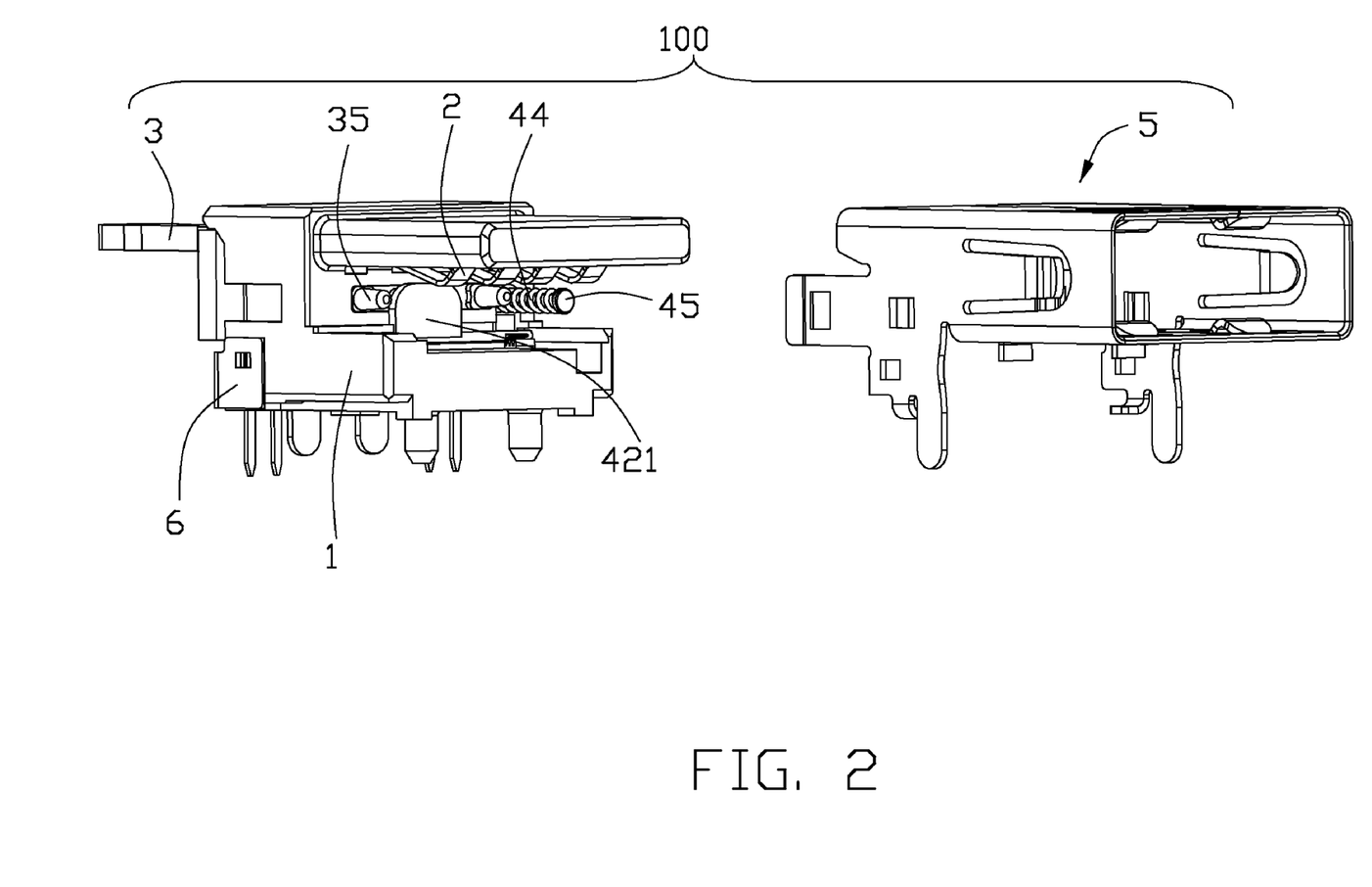
FIG. 2 is a partly exploded view of the optical connector shown in FIG. 1.
Figure 3:
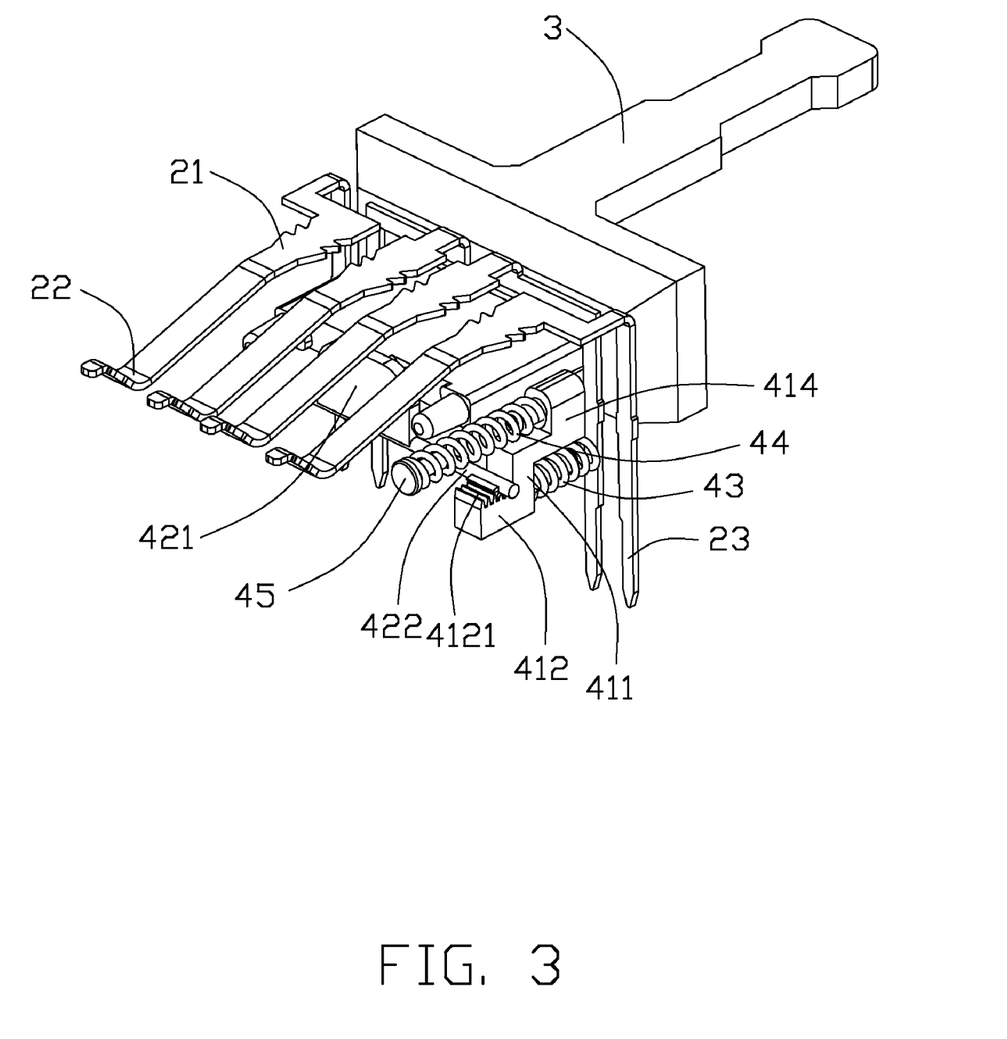
FIG. 3 is a partly perspective view of the optical connector shown in FIG. 1.
Figure 4:
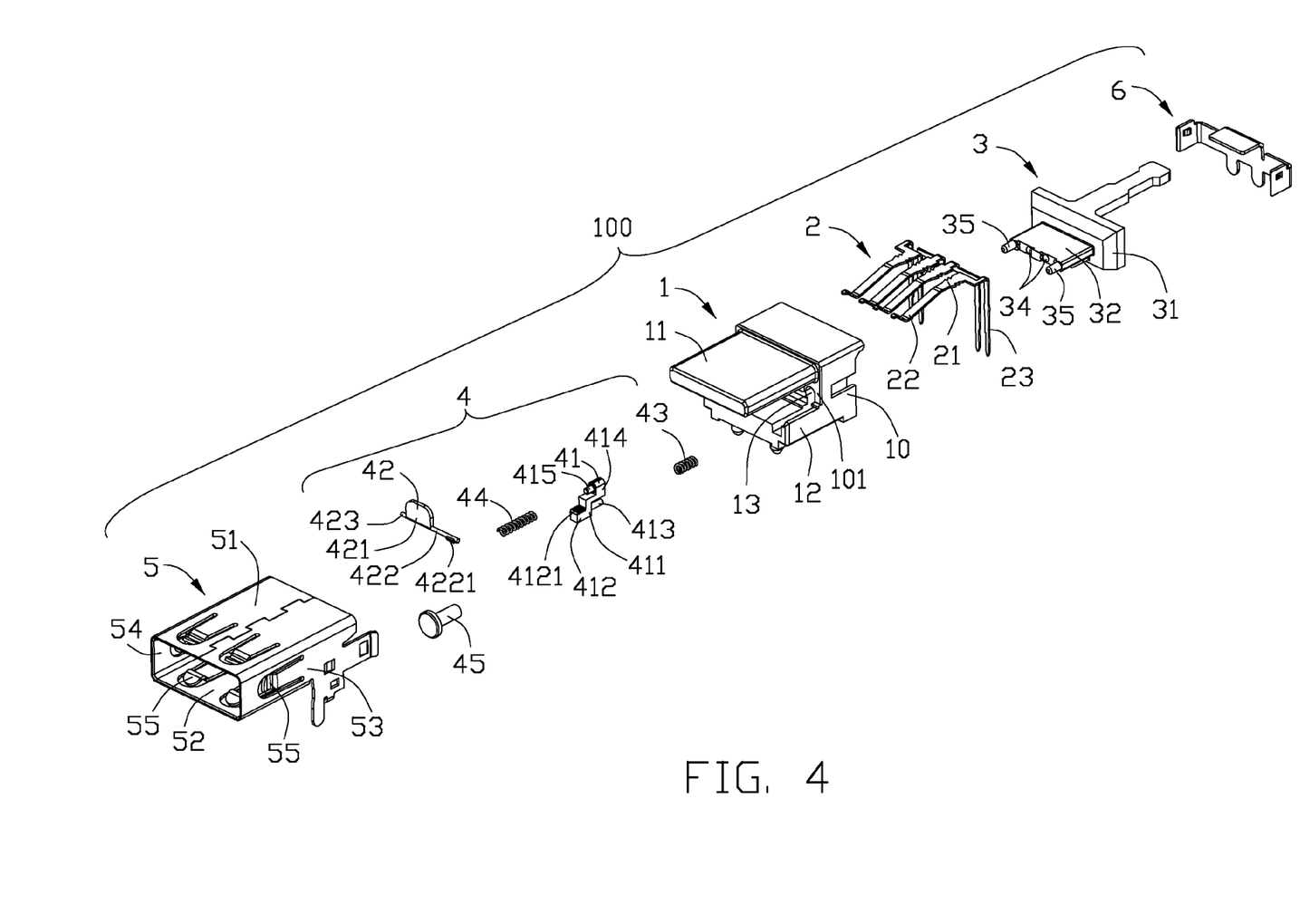
FIG. 4 is an exploded view of the optical connector shown in FIG. 1.
Figure 5:
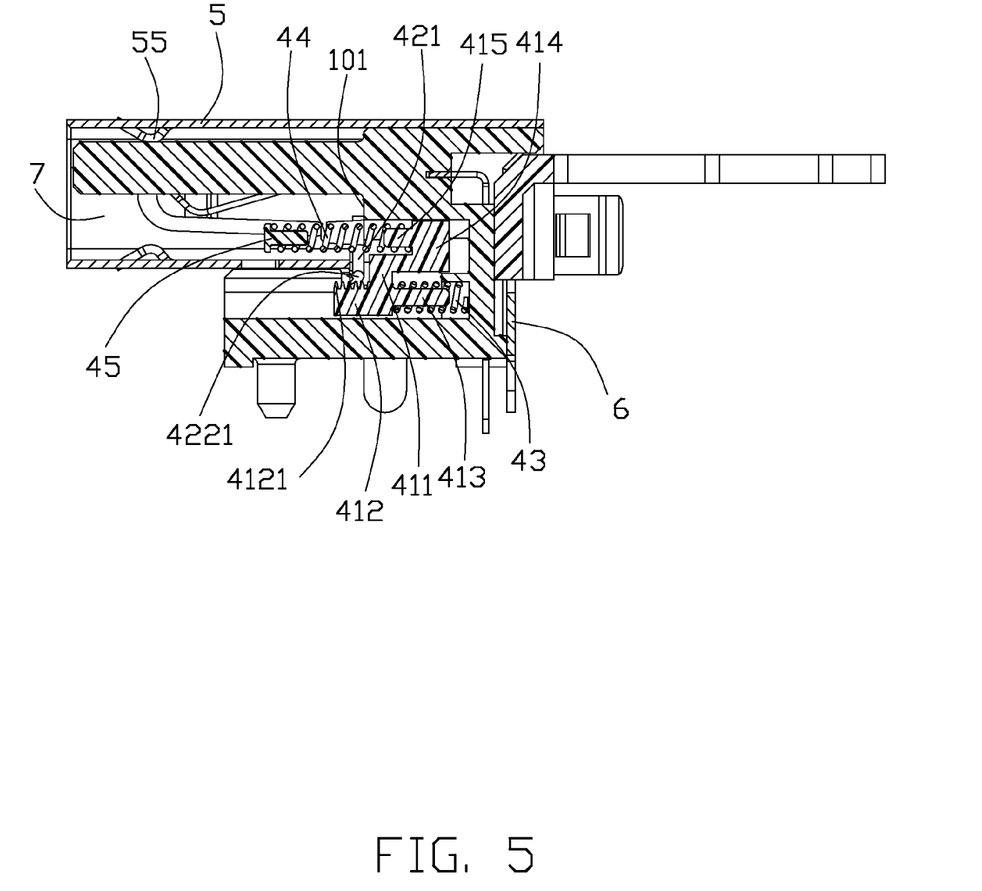
FIG. 5 is a cross sectional view taken along line 5-5 of FIG. 1 showing an internal structure of the optical connector when a corresponding plug is not inserted into the optical connector.

Referring to FIGS. 2, 3 and 5, the slider 41, the first post 413 and the first elastic component 43 are received in the mounting slot 13 and can move in the mounding hole 13 along the insertion direction. The first extension portion 411 and the projection 412, the racks 4121, the first post 413 and the first elastic component 43 are located below the receiving space 7 along the vertical direction. The second elastic component 44 and the bolt 45 extend to the receiving space 7 and beyond the positioning posts 35 to form a resisting portion to abut against the corresponding plug. When the corresponding plug is not inserted into the receiving space 7, the shield portion 421 of the rotary door 42 joints against the front surface 101 along the insertion direction and is located below the tongue 11 and between the positioning posts 35 to cover the light receiving elements 34 along the insertion direction, thereby the light receiving elements 34 can be protected from being covered by dust or destroyed by other thing (not shown).

Figure 6:
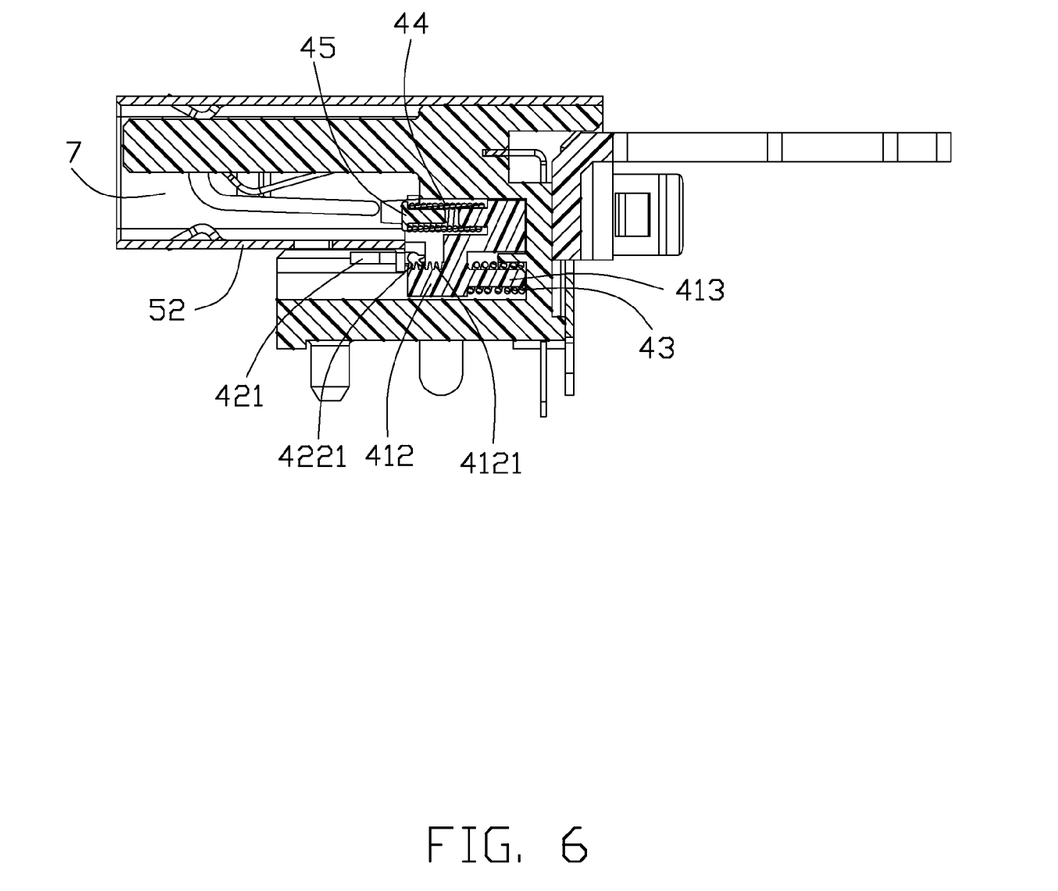
FIG. 6 is a view similar to FIG. 5 showing an internal structure of the optical connector when the plug is inserted into the optical connector.
Figure 7:
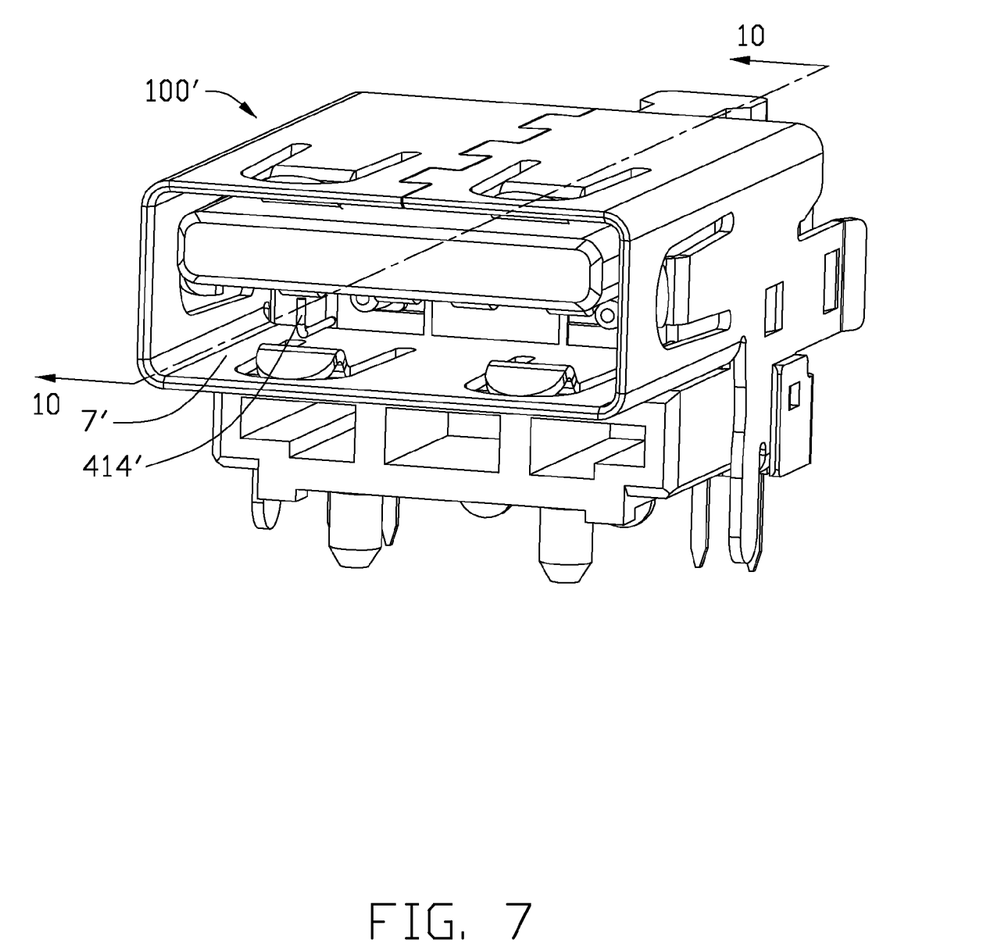
FIG. 7 is a perspective view of an optical connector according to a second embodiment of the present invention.
Figure 8:
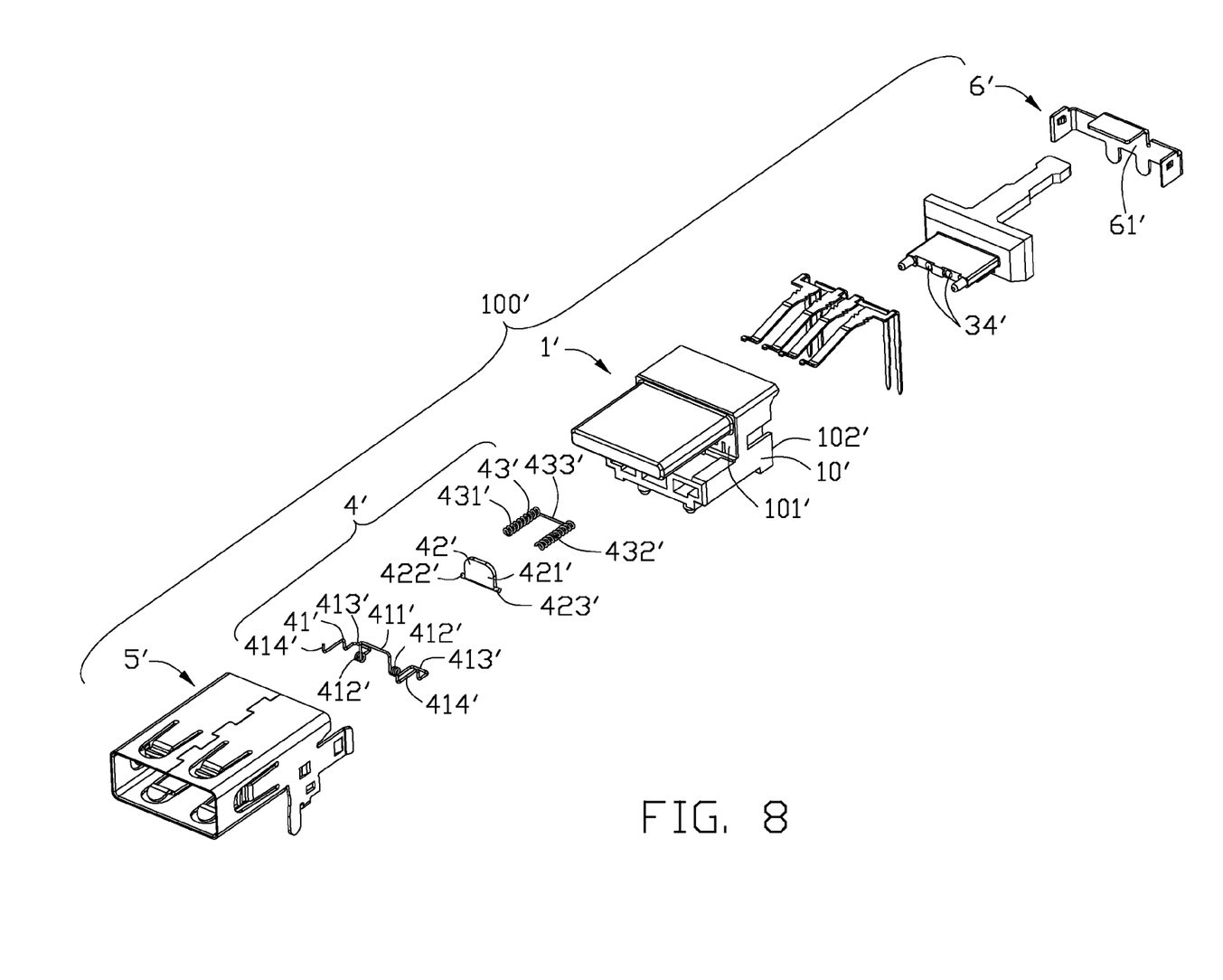

Referring to FIG. 6, when the corresponding plug is inserted into the receiving space 7, the bolt 45 is pressed by the plug to compress the second elastic component 44 backwardly, then the second elastic component 44 is compressed and drives the slider 41 moving in the insertion direction, at the same time, the rack 4121 moves backwardly to drive the gear 4221 and first pivot 422 moving backwardly in the insertion direction, and the first elastic component 43 is compressed by the slider 41, because the shield portion 421 is warded off by the front surface 101 of the base portion 10 along the insertion direction, which make the shield portion 421 rotate along an anticlockwise direction and move backwardly at the same time. When the plug is continually inserted, the shield portion 421 moves through the cutout 521 and escapes from the receiving space 7 gradually. When the corresponding plug is fully inserted into the receiving space 7, the shield portion 421 is horizontally located below the receiving space 7 and the bottom wall 42 of the metal shell 5, then the light receiving elements 34 are forwardly exposed to the receiving space 7, and the optical module 3 can mate with the plug to transmit optical signals therebetween without any hindrance.

As fully described above, when the corresponding plug is not inserted into the receiving space 7, the shield portion 421 of the door 42 lies in a vertical plane and located at a front side of the light receiving elements 34 to protect the light receiving elements 34 from being covered by the dust or destroyed by other thing; and when the corresponding plug is fully inserted into the receiving space 7, the shield portion 421 of the door 42 rotates to lie in a horizontal plane below the receiving space 7 along an up to down direction of the insulative housing 1 to expose the light receiving elements 34 to the receiving space 7 for optically connecting with the plug.

In addition, the second elastic component 44 abuts against the corresponding plug via the bolt 45 directly resists the plug in the first embodiment of the present invention. Of course, the second elastic component 44 can be designed to directly abut against the corresponding plug without the bolt 45, which can reach the same purpose to the optical connector 100. When the corresponding plug is pulled out of the receiving space 7, the first elastic component 423 rebounds to drive the slider 41 moving opposite to the insertion direction, then the rack 4121 meshes with the gear 4221 and drives the gear 4221 rotating along a clockwise direction, at this time, the shield portion 421 of the door 42 rotates along the clockwise direction via driving of the gear 4221. Therefore, the shield portion 421 returns to a preliminary status to shield the light receiving elements 34 for protecting the light receiving elements 34 from being covered by dust or destroyed by other thing.

Referring to FIGS. 7-11, an optical connector 100' in a second embodiment of the present invention is disclosed. The optical connectors 100, 100' in the first and second embodiments are approximately similar to each other except for the structures of the protecting mechanisms 4, 4'. The protecting mechanism 4' comprises a slider 41' retained on the insulative housing 1', a rotary door 42' engaging with the slider 41' and a first elastic component 43'.

The slider 41' is made of metal material and has a n-shaped actuation portion 411' backwardly resisting to a front side of the door 42', a pair of curing portions 412' extending outwardly from two free ends of the actuation portion 411', a pair of movable portion 413' extending backwardly from the curing portions 412' respectively, and a pair of L-shaped resisting portion 414' extending upwardly and forwardly from the movable portion 413' respectively. The rotary door 42' has a shield portion 421', a first pivot 422' and a second pivot 423' extending outwardly from two lower outer ends of the shield portion 421'. The first and second pivots 422', 423' are same to each other and have same length. The first elastic component 43' has a pair of coil springs 431', 432' extending along the insertion direction and a connecting portion 433' connecting rear ends of the coil springs 431', 432'. The coil springs 431', 432' are parallel to each other.

Figure 9:
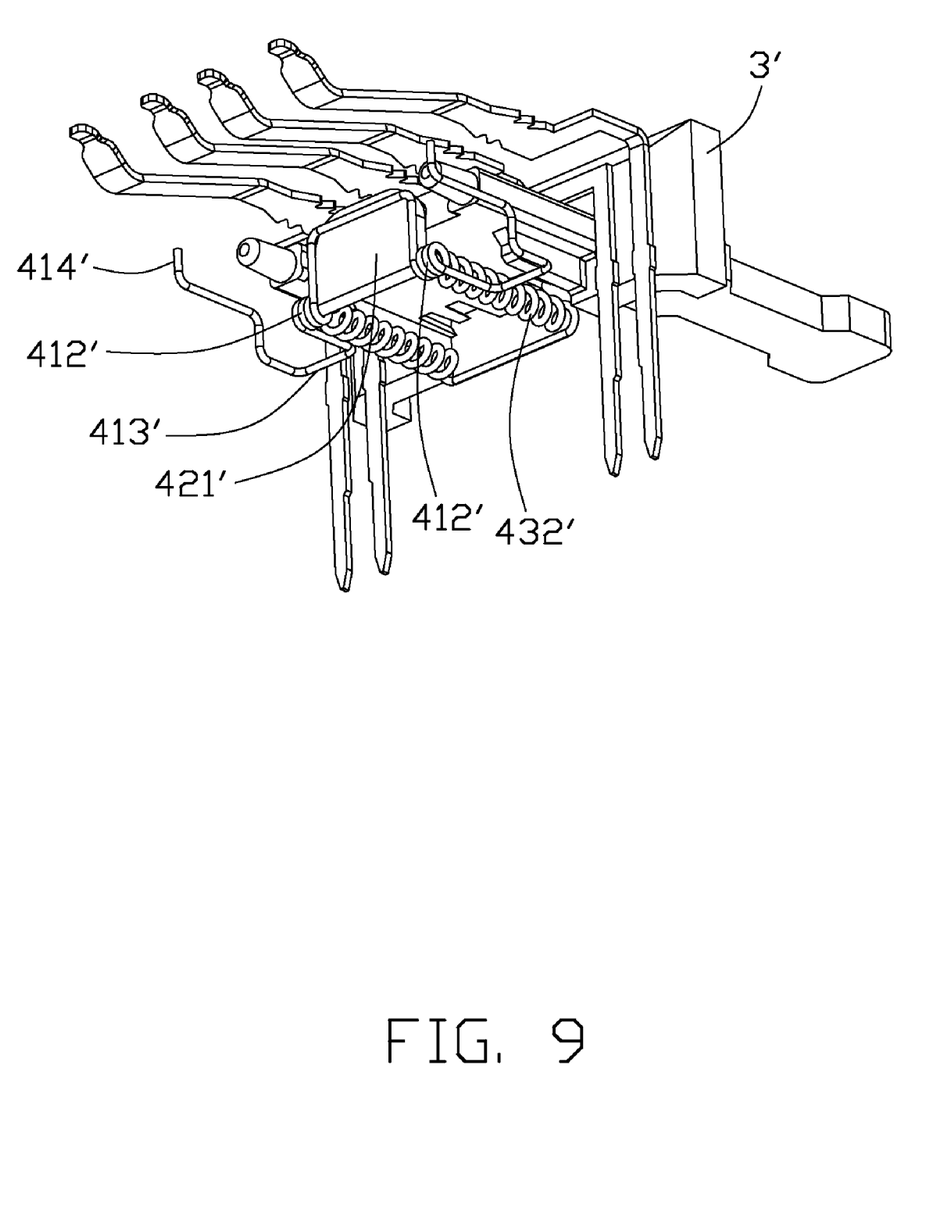
FIG. 9 is a partly perspective view of the optical connector shown in FIG. 7.
Figure 10:
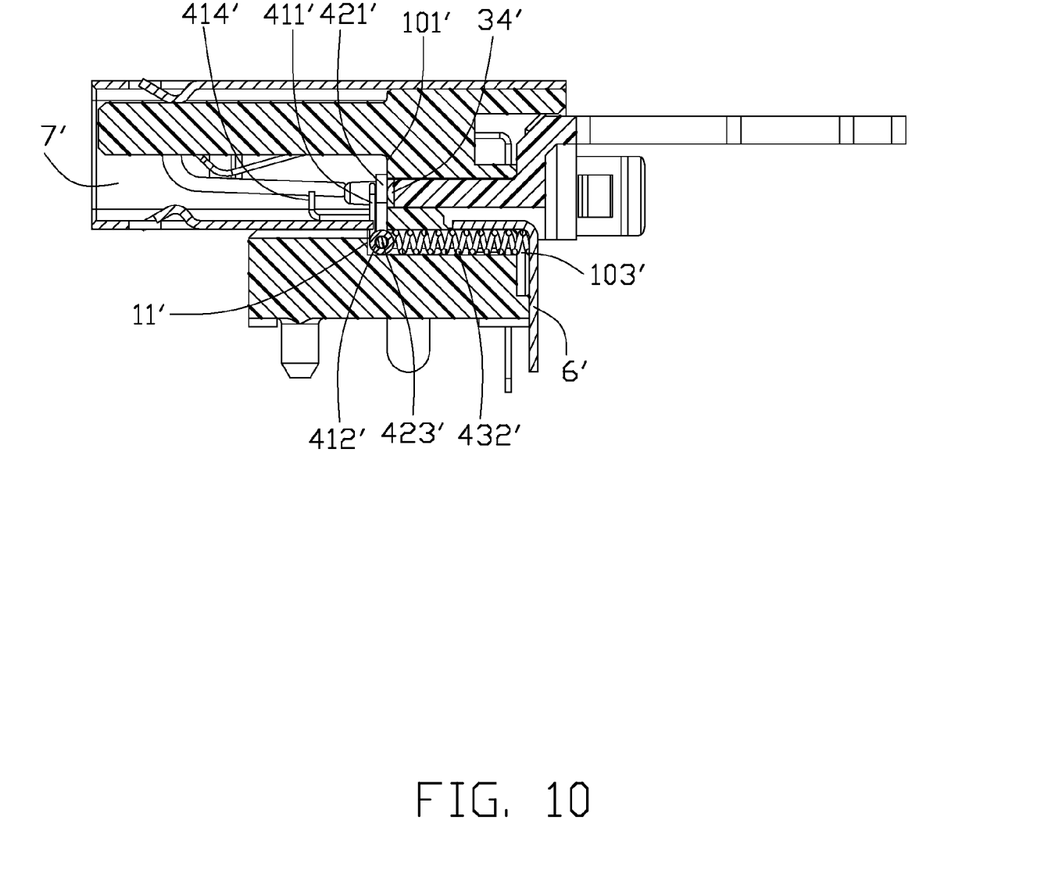
FIG. 10 is a cross sectional view taken along line 10-10 of FIG. 7 showing an internal structure of the optical connector when a corresponding plug is not inserted into the optical connector.
Figure 11:
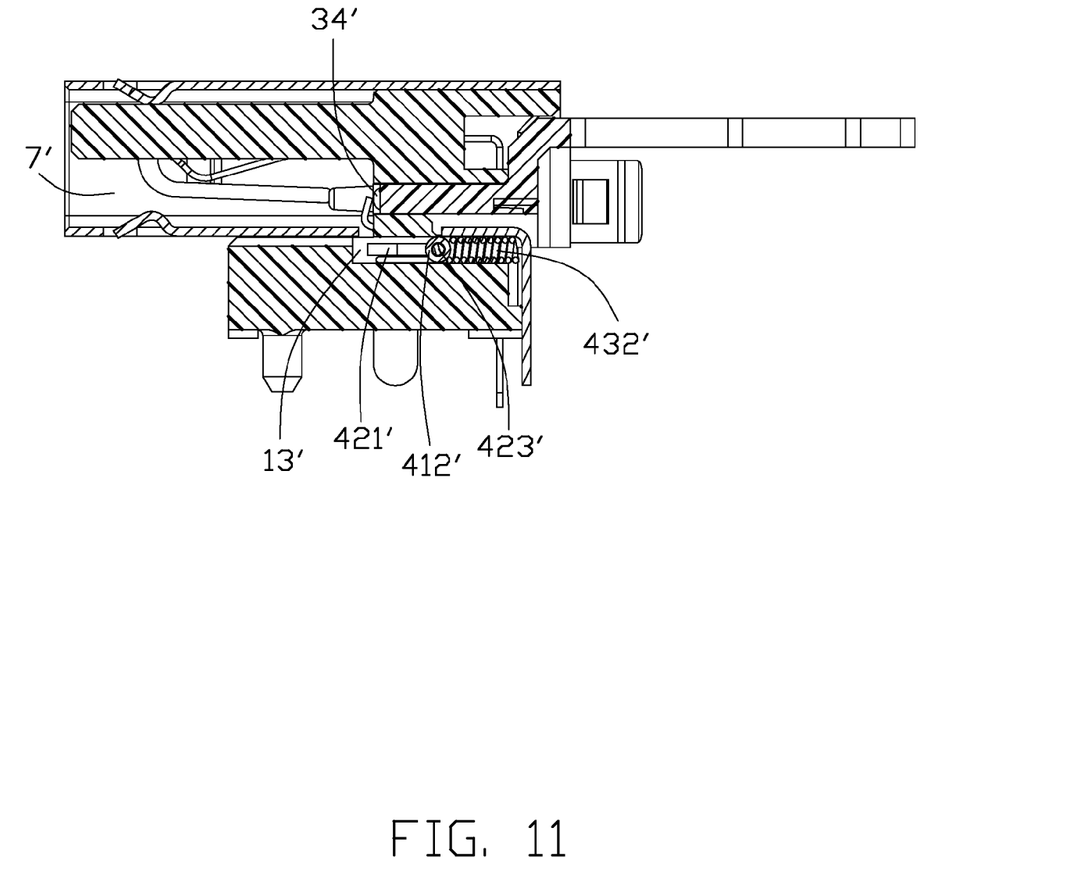
FIG. 11 is a view similar to FIG. 10 showing an internal structure of the optical connector when the plug is inserted into the optical connector.

Referring to FIGS. 9-11, the first and second pivots 422', 423' are inserted into the curing portions 412' of the slider 41', the actuation portion 411' backwardly resists the front side of the shield portion 421'. The insulative housing 1 defines a mounting slot 13' below the receiving space 7' and recessed forwardly from a rear surface 102' of the insulative housing 1'.

In an assembly process of the optical connector 100', the slider 41' and the door 42' are forwardly assembled to the mounting slot 13' from the rear surface 102' of the insulative housing 1' firstly, then the door 42' and actuation portion 411' extends out of the front surface 101' of the insulative housing 1' and lies in the vertical plane to vertically shield the light receiving elements 34' of the optical module 3', the curing portions 412' and the movable portion 413' are received in a front end of the mounting slot 13' and resist to a front inner wall 11' of the mounting slot 13' to prevent the slider 41' from moving forwardly, and the resisting portion 414' forwardly extends into the receiving space 7' to resist the corresponding plug; the first elastic component 43' is forwardly retained to the mounting slot 13' from the rear surface 102' of the insulative housing 1' secondly; at this time, the first elastic component 43' is located behind the slider 41', and a front end of the first elastic component 43' resists the curing portions 412'; thirdly, forwardly inserting the contacts and optical module 3' from the rear surface 102' of the insulative housing 1, then the light receiving elements 34' of the optical module 3' are located behind the shield portion 421' and covered by the shield portion 421' for dustproof; finally, assembling the metal shell 5' from a front side of the insulative housing 1' backwardly and assembling the rear shell 6' from the rear side of the insulative housing 1', the metal shell 5' and rear shell 6' engage with each other, and the rear shell 6' has an inner wall 61' resisting at a rear end of the first elastic component 43' to prevent the first elastic component 43' from moving backwardly.

Referring to FIG. 11, when the corresponding plug is inserted into the receiving space 7', the plug resists the resisting portion 414' to drive the slider 41' moving along the insertion direction; then the curing portions 412' and the pivots 422' 423' are pushed backwardly, and the coil springs 432' of the first elastic component 43' are compressed, because the shield portion 421' of the door 42' is ward off by the front surface 101' of the insulative housing 1', the door 42' would rotate along the anticlockwise direction and be pulled backwardly, then the light receiving elements 34' of the optical module 3' are exposed to the receiving space 7' gradually. When the plug is fully inserted into the receiving space 7', the door 42' lies in a horizontal plane and is horizontally received in the mounting slot 13', and the light receiving elements 34' are fully exposed to the receiving space 7' to optically mate with the plug.

When the corresponding plug is pulled out of the receiving space 7', the coil springs 432' of the first elastic component 43' rebounds to drive the slider 41' moving opposite to the insertion direction, then the actuation portion 411' would resist the door 42' and drive the door 42' along the clockwise direction. Therefore, the shield portion 421' would return to a preliminary status to shield the light receiving elements 34' for protecting the light receiving elements 34' from being covered by dust or destroyed by other thing. Understandably, one feature of the invention is to provide the protective door with an intimate relation with the light receiving element around the mating face of the mating portion for better dust prevention while still exposing the plug receiving cavity to the exterior when no plug is inserted into the connector. Oppositely, when the plug is inserted into the plug receiving cavity in the connector, the protective door is either linearly or rotatably move, corresponding to insertion of the plug in the mating direction, from an inner position to an outer position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical connector defining a receiving space for receiving a corresponding plug, comprising:
   an insulative housing;
   an optical module mounted to the insulative housing, the optical module having a light receiving element forwardly exposed to the receiving space;

a rotary door vertically retained at a rear side of the receiving space to shield the light receiving element; and
a slider engaging with the door;
wherein the slider can move along an inserting direction, and actuate the rotary door to rotate to be in a lying manner at the same time to make the light receiving element of the optical module be exposed to the receiving space when the plug is inserted into the receiving space and pushes the slider backwardly.

2. The optical connector as claimed in claim 1, wherein the insulative housing defines a receiving cavity extending therethrough along the insertion direction to retain the optical module and a mounting slot at one side of the receiving cavity, the receiving cavity communicates and is neighbored with the receiving space, and the slider is received in the mounting slot and can move in the mounting slot along the insertion direction, the slider forwardly extends beyond the rotary door along the insertion direction to be pushed firstly, and the rotary door can rotate downwardly and forwardly without interference with the plug.

3. The optical connector as claimed in claim 2, further comprising a first elastic component resisting to a rear side of the slider, the first elastic component is compressed when the plug is inserted into the receiving space, and rebounds to push the slider to move forwardly to drive the door to rotate upwardly to cover the light receiving element when the plug is pulled out of the receiving space.

4. The optical connector as claimed in claim 3, wherein the insulative housing has a front surface forwardly facing to the receiving space, the light receiving element is retained in the receiving cavity and does not extend out of the front surface, the door has a shield portion lying in a vertical plane and abutting against the front surface to shield the light receiving element when the plug is not inserted into the receiving space and a pivot at a lower side of the shield portion engaging with the slider.

5. The optical connector as claimed in claim 4, wherein the slider has a rack, the pivot is formed with a gear meshing with the rack, so a horizontal movement of the slider brings the shield portion to move along the insertion direction and rotating along the anticlockwise or clockwise direction.

6. The optical connector as claimed in claim 4, wherein the slider is made of metal material, and has a pair of curing portions ringing on the pivot and a pair of resisting portions extending forwardly from the curing portions to abut against the plug.

7. The optical connector as claimed in claim 6, wherein the optical module has a pair of posts extending into the receiving space from two sides of the light receiving element, the shield portion is located between the posts, and the resisting portions extends forwardly into the receiving space and beyond the posts.

8. The optical connector as claimed in claim 1, further comprising a metal shell enclosing the insulative housing and formed said receiving space with the insulative housing, the metal shell defines a cutout at a bottom wall thereof, the door moves through the cutout and is located below the bottom wall when the plug is fully inserted into the receiving space.

9. An optical connector, comprising:
an insulative housing having a tongue;
a metal shell covering the insulative housing and forming a receiving space with the tongue;
an optical module retained on the insulative housing and having a light receiving element located at a rear side of the tongue and forwardly exposed to the receiving space; and
a protecting mechanism located at a front side of the light receiving element to protect the light receiving element from being covered by dust, wherein
the protecting mechanism comprises a slider retained in the insulative housing and a rotary door engaging with the slider, and the slider can slide rearward and bring the rotary door to rotate to be in a lying manner for exposing the light receiving element.

10. The optical connector as claimed in claim 9, wherein, the insulative housing has a base portion with a front surface forwardly facing to the receiving space, the light receiving element is located behind the front surface along an insertion direction of the plug, and the door joints against the front surface and is located at a front side of the front surface to shield the light receiving element when a corresponding plug is not inserted into the receiving space, and is driven to rotate along an anticlockwise direction for exposing the light receiving element to the receiving space when the plug is inserted into the receiving space and presses the slider.

11. The optical connector as claimed in claim 10, wherein the insulative housing defines a mounting slot, the slider is partly received in the mounting slot and moves in the mounting slot along an insertion direction of the plug.

12. The optical connector as claimed in claim 11, wherein the slider has a rack at an upper side thereof, the door has a shield portion covering the light receiving element and resisting to the insulative housing and a pivot at a lower side of the shield portion, and the pivot is formed with gear to mesh with the rack for driving the shield portion moving backwardly and rotating along the anticlockwise direction when the plug pushes the slider backwardly.

13. The optical connector as claimed in claim 9, further comprising a plurality of contacts retained in the insulative housing, each contact has a retaining portion retained in the insulative housing, a contact portion horizontally extending forwardly to the tongue from the retaining portion and a tail portion extending outwardly and downwardly from the retaining portion, the protecting mechanism is offset to the contact portion along both an insertion direction and a vertical direction, and located between the tail portions along a transverse direction.

14. An optical connector for use with a complementary plug, comprising:
a housing defining an optical element mating face with an optical element disposed behind said optical element mating face and with a plug receiving cavity in front to said optical element mating face;
a protective cover moveably assembled within the plug receiving cavity; wherein
said protective cover is located at a standing position to essentially intimately shield the optical element around the optical element mating face in a mating direction while the plug receiving cavity is essentially still open to an exterior when no plug is received in the plug receiving cavity; said protective cover is moved to a lying position when the plug is inserted into the plug receiving plug under condition that the protective cover is roughly rotated outwardly from the standing position to the lying position to unveil said optical element in said mating direction.

15. The optical connector as claimed in claim 14, wherein said protective cover is essentially parallel to said optical element mating surface in the lying position.

16. The optical connector as claimed in claim 15, wherein the protective cover defines a stationary pivot during rotation from the standing position to the lying position.

17. The optical connector as claimed in claim 16, where the protective cover is provided with a gear structure to convert a linear movement due to insertion of the plug to a rotation movement.

18. The optical connector as claimed in claim 1, wherein the slider actuates the rotary door to rotate outwardly.

19. The optical connector as claimed in claim 9, wherein the slider brings the rotary door to rotate outwardly to be in the lying manner.

20. The optical connector as claimed in claim 14, wherein the housing further defines a tongue with thereof a plurality of electrical contacts facing the plug receiving cavity in a direction perpendicular to said mating direction.

* * * * *